United States Patent
Atkins et al.

(10) Patent No.: US 8,641,957 B2
(45) Date of Patent: Feb. 4, 2014

(54) MOLDING COSMETIC COMPOSITE PANELS WITH VISIBLE FIBERS FROM ULTRAVIOLENT LIGHT RESISTANT EPOXY COMPOSITIONS

(75) Inventors: Richard P. Atkins, Utica, MI (US);
Choongyong Kwag, Troy, MI (US);
Chen-Shih Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1164 days.

(21) Appl. No.: 11/735,718

(22) Filed: Apr. 16, 2007

(65) Prior Publication Data
US 2008/0008868 A1  Jan. 10, 2008

Related U.S. Application Data

(60) Provisional application No. 60/818,703, filed on Jul. 5, 2006.

(51) Int. Cl.
*B32B 27/04* (2006.01)

(52) U.S. Cl.
USPC .................. 264/294; 264/319; 264/320

(58) Field of Classification Search
USPC ............... 264/241, 257, 236, 239, 319, 320; 428/411.1, 413
See application file for complete search history.

(56) References Cited

U.S. PATENT DOCUMENTS

| | | | |
|---|---|---|---|
| 3,694,541 A * | 9/1972 | Gelin | 264/294 |
| 3,789,071 A * | 1/1974 | Babayan | 564/57 |
| 4,097,449 A * | 6/1978 | Heilman et al. | 523/444 |
| 4,506,042 A | 3/1985 | Tsuboi et al. | |
| 4,668,460 A * | 5/1987 | Ongena | 264/255 |
| 5,190,828 A | 3/1993 | Katsumata | |
| 5,917,080 A * | 6/1999 | Holderbaum et al. | 558/402 |
| 6,071,836 A * | 6/2000 | St. Lawrence et al. | 442/237 |
| 6,627,704 B2 | 9/2003 | Yeager et al. | |
| 2003/0096123 A1 * | 5/2003 | Yeager | 428/461 |
| 2003/0114606 A1 * | 6/2003 | Taniguchi et al. | 525/523 |
| 2004/0023050 A1 | 2/2004 | Kia et al. | |
| 2005/0191476 A1 | 9/2005 | Oosedo et al. | |
| 2006/0029811 A1 | 2/2006 | Sugioka et al. | |
| 2006/0038324 A1 * | 2/2006 | Yeager et al. | 264/319 |
| 2006/0106166 A1 | 5/2006 | Inada et al. | |

OTHER PUBLICATIONS

Int. Search Report for PCT/US 07/71062, Jun. 13, 2007, GM Global Technology Oper.

* cited by examiner

*Primary Examiner* — Galen Hauth
(74) *Attorney, Agent, or Firm* — BrooksGroup

(57) ABSTRACT

One embodiment of the invention provides a method including molding composite panels that are UV resistant, substantially free of fiber readout, and have visible fibers from epoxy compositions comprising resins having aromatic rings.

20 Claims, 2 Drawing Sheets

MOLDING COSMETIC COMPOSITE PANELS WITH VISIBLE FIBERS FROM ULTRAVIOLENT LIGHT RESISTANT EPOXY COMPOSITIONS

CROSS-REFERENCE TO RELATED APPLICATIONS

This application claims the benefit of U.S. Provisional Application No. 60/818,703, filed Jul. 5, 2006.

TECHNICAL FIELD

The field to which the disclosure generally relates includes composite panels and methods of making and using the same, and compositions thereof.

BACKGROUND OF THE INVENTION

Cosmetic composite panels with visible carbon fiber weaves have been molded by the autoclave cure of a hand lay-up of carbon fiber/epoxy prepreg into a single-sided mold. Resin transfer molding using matched molds and dry fiber weaves is also a known method for molding such composites panels. After subassembly, if needed, the panels are coated with clear primers and/or clear topcoats to satisfy automotive surface finishing requirements, for example gloss, while maintaining the visibility of the fiber weaves. The clear primers and clear topcoats also provide ultraviolet light (UV) resistance. The UV protection provided by clear primers and clear topcoats, however, is generally insufficient for epoxy based cosmetic panels since epoxy resins are known to be UV vulnerable and degradation at the interface between substrates and clear primers or clear coats will lead to discoloration and eventually de-lamination.

SUMMARY OF THE INVENTION

One embodiment of the invention includes a method of making a cosmetic composite panel with visible fibers comprising impregnating a fiber mat with a clear resin. The impregnated fiber mat is placed in a preforming tool and heat and pressure is applied to partially cure the resin to a semi-solid state to provide a preform. The preform is placed in a cavity of a molding tool and greater heat and pressure is applied to reflow at least a portion of the resin and to cure any uncured portion of the resin so that a finished molded composite panel is produced with an epoxy based polymer that is transparent and wherein the composite panel is UV resistant and substantially free of fiber readout. The resin includes a relatively low molecular weight diglycidyl ether of bisphenol-A and/or a relatively higher molecular weight diglycidyl ether of bisphenol-A.

One embodiment of the invention includes a composition for making molded cosmetic composite panels with visible fibers including an epoxy resin comprising aromatic rings. In one embodiment of the invention, the composition includes a relatively low molecular weight diglycidyl ether of bisphenol-A and/or a relatively higher molecular weight diglycidyl ether of bisphenol-A. In one embodiment, the composition further includes a hardener comprising an anhydride, such as at least one of methyl tetrahydrophthalic anhydride or methyl hexahydrophthalic anhydride. In one embodiment of the invention, the composition further includes a catalyst comprising an amine, such as N,N-benzyldimethylamine. In another embodiment, the composition may further include an ultraviolet light stabilizer comprising 2-ethylhexyl-2-cyano-3,3-diphenylacrylate. In another embodiment, the composition may further include a nanoparticle dispersion, such as silica based nanoparticles in a diglycidyl ether of bisphenol-A resin.

Other exemplary embodiments of the present invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF AN EXEMPLARY EMBODIMENT

The following description of the embodiment(s) is merely exemplary in nature and is in no way intended to limit the invention, its application, or uses.

Figure 1:
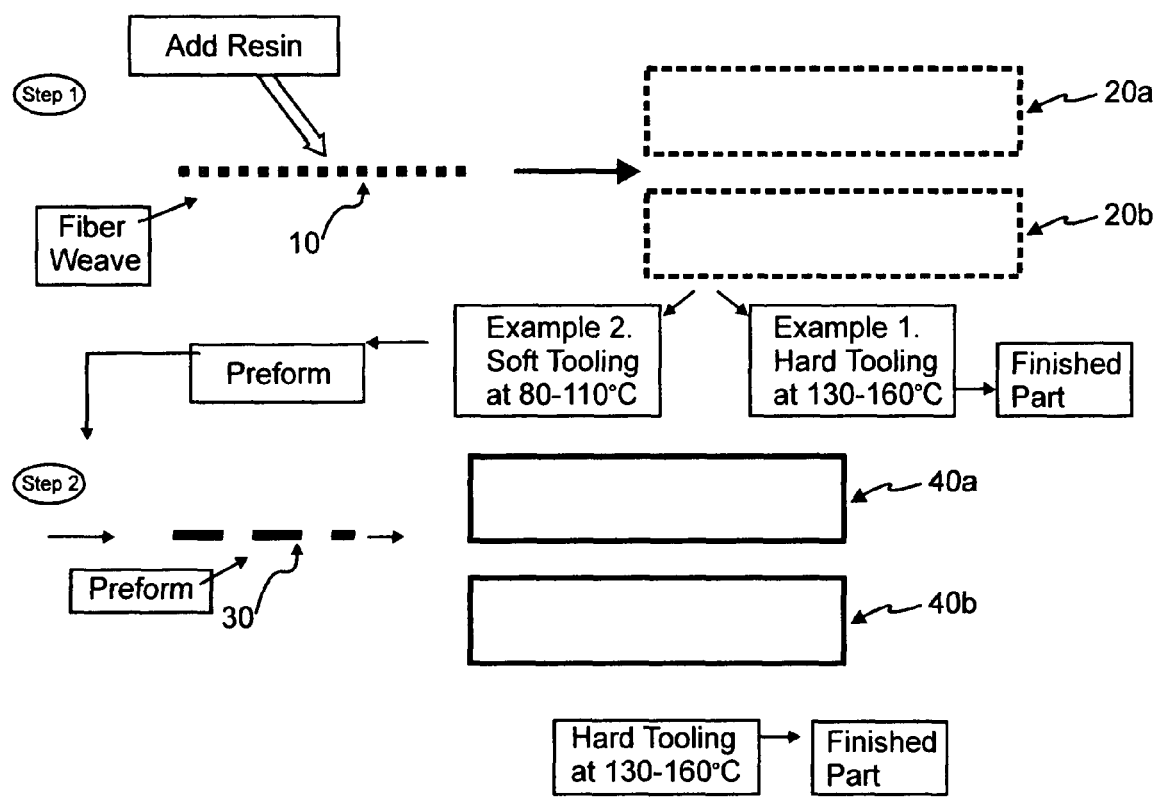
FIG. 1 illustrates a process of compression molding a fiber mat and a curable clear resin according to one embodiment of the invention.

One embodiment of the invention includes a method of compression molding cosmetic panels with visible carbon fiber weaves using clear or lightly filled resins. As shown in FIG. 1, the method comprises using a two-step compression molding process to reflow the surface of a partially cured preform of carbon fiber weave and epoxy resin. The most successful use of this procedure occurs when the preform is compressed at a pressure significantly lower than the full molding pressure and the final molding uses a slightly thinner cavity than was used for the preforming compression.

One embodiment of the invention is a two-step compression molding process, as illustrated in FIG. 1. For example, in step 1 of this process, two pieces of dry carbon fiber weave 10 (TC411 2×2 Twill, T700S, 12K carbon fiber, 385 gsm FAW by Sigmatex High Technology Fabrics, Inc., Benicia, Calif.) may be placed into the preform mold 20a, 20b (254 mm×254 mm×1.1 mm), which can be a soft tool of less precise surface definition than the final cure mold. A resin selected from Compositions 2-13 described hereafter may be distributed through the fiber preform under 0.4 MPa pressure. The resin may be then cured at 100° C. for 10 minutes to form a 1.1 mm thick, partially cured (approximately 25%) preform 30. At step 2, the partially cured preform 30 may be transferred to the final cure mold 40a, 40b (254 mm×254×1.0 mm) with a high quality surface for the finish molding at 140° C. for 20 minutes under 1.5 MPa pressure. During the cure molding in the finish tooling, the surface reflows to give a 1.0 mm thick visible carbon fiber composite panel with an improved surface quality.

In one embodiment of the invention, in the first step the fiber mat and resin may be heated at a temperature ranging from about 80° C. to about 110° C., and at a pressure ranging from about 0.2 MPa to about 0.5 MPa. In illustrative embodiments of the invention, the fiber mat may be made from at least one of carbon fibers, glass fibers, or other synthetic or natural fibers. The fiber mat may be woven or unwoven. In one embodiment of the invention, about 10% to about 60% of the resin is cured in the first step. In the second step, the partially cured preform may be heated at a temperature ranging from about 130° C. to about 160° C., and at a pressure ranging from about 1.0 MPa to about 2.0 MPa.

The molding process may be accomplished in a variety of ways including those described in Assignee's co-pending application entitled "Method for Molding Composite Panels With Visible Carbon Fiber Weaves" Ser. No. 12/950,401, portions of the disclosure of which are repeated hereafter.

In one embodiment, the second cavity is thinner than the first cavity. This adjustment in the thickness may be accomplished in many different ways. In one embodiment, the thickness adjustment may be accomplished by using a separate lower cost tool for the preform. The first compression molding tool may be a lower cost tool and the second compression molding tool may be a separate higher cost tool. The first compression molding tool may be a soft tool of less precise surface definition than the second compression molding tool. For example, the first compression molding tool 20a, 20b may be a soft tool made from relatively soft material such as glass or carbon fiber-epoxy laminates and zinc alloys. The second compression molding tool 40a, 40b may have a high quality surface for the finish molding.

In another embodiment, the first compression molding tool and the second compression molding tool may be the same tool. If the same tool is used for both steps, then the mold may be designed to close to two different gaps. The first cavity may close to a first gap and the second cavity may close to a second gap. In another embodiment, spacers are used in the cavity of the compression molding tool to create two different thicknesses. A first spacer may be placed in the first cavity to create a first gap. A second spacer may be placed in the second cavity to create a second gap. The first gap may be larger than the second gap.

Another embodiment of the invention uses a collapsing mold to create two different thicknesses. At the preforming stage, a series of air or hydraulic cylinders may hold the mold open the extra thickness needed for the preform molding. The cylinders may hold the compression molding tool open the distance of a first gap. Then for the final part molding, the pressure may be released on the cylinders and the mold may close to the design intent thickness for the part.

In another embodiment, the compression molding tool is built to the preform thickness and then a disposable shim of plastic film or a disposable film of aluminum sheeting is used to compress the preform in the second cavity for the final molding.

In alternative embodiments of the invention, the curable resin compositions may include an epoxy resin consisting of aromatic rings. In one embodiment of the invention, the curable resin includes a relatively low molecular weight diglycidyl ether of bisphenol-A and/or a relatively higher molecular weight diglycidyl ether of bisphenol-A. In various embodiments of the invention, the curable resin compositions include an epoxy resin which may have an average molecular weight ranging from about 300 to about 1200 or from about 300 to about 500 or from about 800 to about 1200, may have an average number of repeating units ranging from about 0.1 to about 2.5, and/or may be present in an amount of about 30 to about 80 weight percent. The composition may also include an anhydride hardener such as methyl tetrahydrophthalic anhydride or methyl hexahydrophthalic anhydride. The hardener may be present in amount of about 20 to about 60 weight percent.

The composition may further include a catalyst such as, for example, an amine based catalyst. In one embodiment the catalyst may include N,N-benzyldimethylamine. In one embodiment the catalyst may be present in amount of about 0.4 to about 2.0 weight percent. In another embodiment, the curable resin composition may further include an ultraviolet light stabilizer which may, for example, include 2-ethylhexyl-2-cyano-3,3-diphenylacrylate. In one embodiment the ultraviolet light stabilizer may be present in an amount of about 1 to about 3 weight percent.

In another embodiment of the invention, the curable resin may further include a filler. In one embodiment of the invention the filler may include nanoparticles, such as silica or titanium dioxide based nanoparticles. Unlike a composition containing conventional micron sized filler particles, the resin composition containing nanoparticles is transparent since nanoparticles are too small to scatter the visible light. One embodiment of the invention may include a nanoparticle dispersion, which may, for example, include silica nanoparticles in a diglycidyl ether of bisphenol-A resin. In one embodiment of the invention, the nanoparticles in the dispersion may range from about 10 to about 45 weight percent. In one embodiment of the invention, the nanoparticles may be present in amount of about 0 to about 30 weight percent.

The preforming tool may be a soft tool made from relatively soft material such as glass or carbon fiber-epoxy laminates and zinc alloys.

Figure 2:
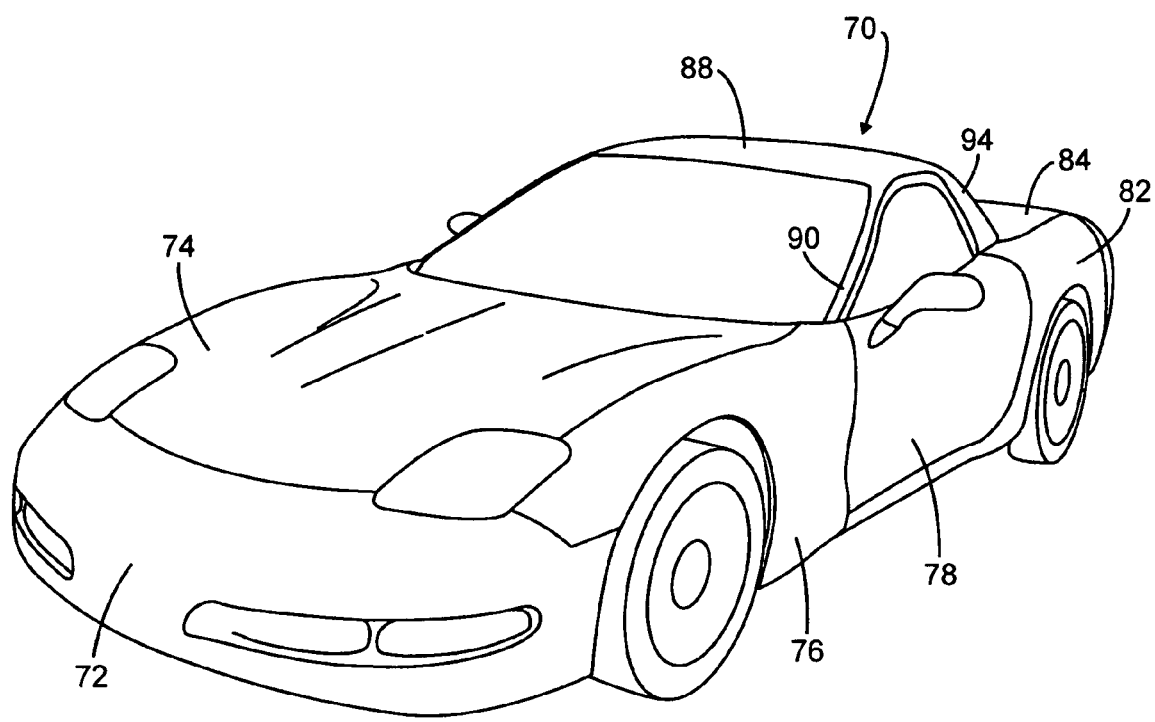
FIG. 2 illustrates a product including molded composite panels according to one embodiment of the invention.

Referring now to FIG. 2, in one embodiment of the invention, molded composite panels, as described above, may be utilized to form body panels of a vehicle 70 including, but not limited to, the front fascia 72, hood 74, front fender 76, front door 78, rear doors (if present), rear fenders 82, trunk lid 84, roof 88, and pillars 90 and 94. The molded composite panels may be attached to the vehicle body (not shown) which is attached to a vehicle frame (not shown) in a manner known to those skilled in the art.

To demonstrate embodiments of the invention, visible carbon fiber composite panels were prepared using materials described in the following examples.

Material Preparation and Testing

Ingredients used in this work are summarized in the following table:

| Ingredient | Chemical Name | Trade name |
|---|---|---|
| Epoxy Resin | 3,4-epoxycyclohexylmethyl 3,4-epoxycyclohexanecarboxylate, EEW = 131-143 | CY179 (Huntsman) |
| | DGEBA (diglycidyl ether of bisphenol-A), EEW = 176-183 (n = 0.1) | DER 383 (Dow) |
| | DGEBA (diglycidyl ether of bisphenol-A), EEW = 192-203 (n = 0.2) | DER 317 (Dow) |
| | DGEBA (diglycidyl ether of bisphenol-A), EEW = 230-250 (n = 0.5) | DER 337 (Dow) |
| | DGEBA (diglycidyl ether of bisphenol-A), EEW = 450-530 (n = 2.0) | Araldite GT 7071 (Hunstman) or Epon 1001F (Hexion) |
| Hardener | MTHPA (methyl tetrahydrophthalic anhydride) mw = 166.2 | MTHPA 600 (Lonza AG) |
| | MHHPA (methyl hexahydrophthalic anhydride) mw = 168.2 | MHHPA (Lonza AG) |
| Catalyst | BDMA (N,N-benzyldimethylamine) | N,N-benzyl-dimethylamine (Aldrich) |
| | DMI (1,2-dimethyl imidazole) | 1,2-dimethyl imidazole (BASF) |
| UV Stabilizer | 2-(2H-benzotriazol-2-yl)-4,6-ditertpentylphenol | Tinuvin 328 (Ciba) |
| | 2-Ethylhexyl-2-cyano-3,3-diphenylacrylate | Uvinul 3039 (BASF) |

-continued

| Ingredient | Chemical Name | Trade name |
|---|---|---|
| Filler | Nanosilica dispersed (40 wt %) in DGEBA (EEW ≡ 180) | Nanopox F400 (Hanse Chemie AG) |
| Diluent | Diethylene Glycol | Diethylene Glycol (Alfa Aesar) |

Except for the composition containing Araldite GT 7071 or Epon 1001F, all epoxy compositions were mixed at 50° C. under vacuum for 30 minutes. Since Araldite GT 7071 and Epon 1001F have a melting point ranging from 65° C. to 80° C., the compositions containing this resin were first mixed at 100° C. and then lowered to 70° C. for addition of the hardeners and catalysts. The resultant mixtures were cast into a glass plaque mold (12"×12"×0.125") and cured for 30 minutes at 90° C. and 2 hours at 150° C. in a hot air oven unless otherwise specified.

The cure shrinkage (vol %) of the resin compositions was determined by comparing the measured densities of liquid (before curing) and solid (after curing) resins. The shrinkage value is known as the most important material property determining the surface quality, especially the degree of fiber readout, of a fiber containing composite panel. The UV resistance of the epoxy compositions (measured by total discoloration of the sample, $\Delta E$) was determined by weathering the cured epoxy plaques in a water cooled Xenon arc chamber using the accelerated exposure procedure specified by SAE J 1960 standard.

Material Performance

Composition 1:

Composition 1 is used as a reference epoxy resin for comparison with compositions developed by this invention. Composition 1 included the formulation: 100 parts (by weight) of CY179 epoxy resin, 120 parts of MHHPA, 6.6 parts of DMI, 0.2 parts of Tinuvin 328, and 11 parts of diethylene glycol. The mixture was cured for 2 hours at 70° C. and another 2 hours at 100° C. The measured cure shrinkage and UV resistance for this aliphatic epoxy composition are shown in the table below:

| Composition | Cure Shrinkage (vol %) | $\Delta E$ (at 1000 KJ/m$^2$) | $\Delta E$ (at 2000 KJ/m$^2$) |
|---|---|---|---|
| 1 | 1.8 | 4.6 | 3.7 |

Composition 2:

In contrast to Composition 1, Composition 2 was prepared according to one embodiment of the invention using epoxy resins comprising aromatic rings. The formulation of Composition 2 was 100 parts of DER 383 epoxy resin, 80 parts of MTHPA 600, and 2 parts of BDMA. The measured cure shrinkage and UV resistance for this composition are as follows:

| Composition | Cure Shrinkage (vol %) | $\Delta E$ (at 1000 KJ/m$^2$) | $\Delta E$ (at 2000 KJ/m$^2$) |
|---|---|---|---|
| 2 | 2.0 | 5.6 | 4.4 |

The cure shrinkage of Composition 2 is comparable to the cure shrinkage of Composition 1. The UV resistance of Composition 2 comprising aromatic rings is surprisingly only slightly worse than that of the aliphatic epoxy based Composition 1 as indicated by the slightly increased discoloration.

Composition 3:

Composition 3 was prepared by adding a UV stabilizer to Composition 2. The formulation was 100 parts of DER 383, 80 parts of MTHPA 600, 2 parts of BDMA, and 1.8 parts of Uvinul 3039. The resulting composition had the following cure shrinkage and UV resistance:

| Composition | Cure Shrinkage (vol %) | $\Delta E$ (at 1000 KJ/m$^2$) | $\Delta E$ (at 2000 KJ/m$^2$) |
|---|---|---|---|
| 3 | 1.5 | 5.9 | 4.7 |

The data indicate that the UV stabilizer was not able to provide any significant change or improvement in either UV resistance or cure shrinkage in comparison to Composition 2.

Composition 4:

Composition 4 was prepared by adding nanosilica particles to Composition 2 comprising aromatic epoxy resin. The formulation of Composition 4 was 167 parts of Nanopox F400, 80 parts of MTHPA 600, and 2 parts of BDMA. The Nanopox F400 is a dispersion of 40 wt % of nanosilica and 60 wt % of DGEBA epoxy resin.

As shown in the following table, the cure shrinkage of Composition 4 was found significantly improved as compared with Composition 2. The UV resistance of Composition 4, however, became lower than that of Compositions 1-3 at the same UV exposures.

| Composition | Cure Shrinkage (vol %) | $\Delta E$ (at 1000 KJ/m$^2$) | $\Delta E$ (at 2000 KJ/m$^2$) |
|---|---|---|---|
| 4 | 0.6 | 7.5 | 9.0 |

Compositions 5-8:

The formulations used to prepare Compositions 5-8 are given in the following table. These compositions were prepared by blending a relatively low molecular weight diglycidyl ether of bisphenol-A and a relatively higher molecular weight diglycidyl ether of bisphenol-A.

| Composition | DER 383 (Parts) | Araldite GT 7071 or Epon 1001F (Parts) | MTHPA 600 (Parts) | BDMA (Parts) |
|---|---|---|---|---|
| 5 | 50 | 50 | 60 | 2 |
| 6 | 50 | 50 | 60 | 0.67 |
| 7 | 50 | 50 | 48 | 2 |
| 8 | 60 | 40 | 54 | 0.67 |

The measured cure shrinkage and UV resistance for these compositions are listed below:

| Composition | Cure Shrinkage (vol %) | $\Delta E$ (at 1000 KJ/m$^2$) | $\Delta E$ (at 2000 KJ/m$^2$) |
|---|---|---|---|
| 5 | 0.9 | 7.3 | 6.5 |
| 6 | 0.6 | 1.7 | 0.7 |
| 7 | 0.6 | 1.6 | 1.3 |
| 8 | 0.9 | 5.5 | 3.9 |

The results show that Compositions 6 and 7 both exhibit significantly lower cure shrinkage and higher UV resistance over the reference epoxy resin Composition 1 comprising a single aliphatic epoxy resin and over Composition 2 comprising a single aromatic epoxy resin.

Compositions 9-11:

The formulations used for preparing Compositions 9-11 are tabulated in the following:

| Composition | DER 383 (Parts) | Araldite GT 7071 or Epon 1001F (Parts) | MHHPA (Parts) | BDMA (Parts) |
|---|---|---|---|---|
| 9 | 50 | 50 | 60 | 0.67 |
| 10 | 60 | 40 | 60 | 0.67 |
| 11 | 60 | 40 | 54 | 0.67 |

The resulting cure shrinkage and UV resistance for these compositions are shown in the table below:

| Composition | Cure Shrinkage (vol %) | $\Delta E$ (at 1000 KJ/m$_2$) | $\Delta E$ (at 2000 KJ/m$_2$) |
|---|---|---|---|
| 9 | 0.5 | 7.3 | 8.3 |
| 10 | 0.6 | 8.7 | 11.3 |
| 11 | 0.6 | 3.5 | 1.9 |

The results show that significant improvement in both cure shrinkage and UV resistance was achieved by Composition 11 comprising a relatively low molecular weight diglycidyl ether of bisphenol-A and a relatively higher molecular weight diglycidyl ether of bisphenol-A.

To further demonstrate the advantage of using aromatic epoxy blends comprising a relatively low molecular weight diglycidyl ether of bisphenol-A and a relatively higher molecular weight diglycidyl ether of bisphenol-A for making UV resistant cosmetic composite panels, two additional resin compositions were prepared with different molecular weight aromatic epoxy resins and tested. The formulations of Compositions 12 and 13 are tabulated in the following:

| Composition | DER 317 (Parts) | DER 337 (Parts) | Araldite GT 7071 or Epon 1001F (Parts) | MTHPA 600 (Parts) | BDMA (Parts) |
|---|---|---|---|---|---|
| 12 | 47 | 0 | 53 | 52 | 0.67 |
| 13 | 0 | 40 | 60 | 48 | 0.67 |

The measured cure shrinkage and UV resistance of these compositions are listed below:

| Composition | Cure Shrinkage (vol %) | $\Delta E$ (at 1000 KJ/m$^2$) | $\Delta E$ (at 2000 KJ/m$^2$) |
|---|---|---|---|
| 12 | 0.3 | 3.4 | — |
| 13 | 0.4 | 1.5 | — |

The results show that significant improvement in both cure shrinkage and UV resistance was achieved by Composition 13 comprising again a relatively low molecular weight diglycidyl ether of bisphenol-A and a relatively higher molecular weight diglycidyl ether of bisphenol-A.

The above data suggest that epoxy compositions containing a blend of a relatively low molecular weight diglycidyl ether of bisphenol-A resin and a relatively higher molecular weight diglycidyl ether of bisphenol-A resin, a methyl tetrahydrophthalic anhydride or methyl hexahydrophthalic anhydride hardener, and a N,N-benzyldimethylamine catalyst are uniquely suitable for molding cosmetic composite panels with visible carbon fibers due to their low cure shrinkage and high UV resistance. While the compositions may be utilized in the illustrative two-step compression molding process disclosed above, they are equally usable for the liquid composite molding process of various forms. Furthermore, the compositions are also expected to be ideal for making prepregs for layup and autoclave curing. The high molecular weight resin component in these compositions makes the resins exhibit high viscosity and low cure rate at lower temperatures as required by the prepreg materials. The cure characteristics at higher temperatures of the resulting prepregs can then be fine tuned by adjusting the concentrations of hardeners and catalysts.

Additionally, it should be noted that the compositions disclosed in this submission are representative. The compositions are expected to work as well or better within a range of the concentration of each component.

The above description of embodiments of the invention is merely exemplary in nature and, thus, variations thereof are not to be regarded as a departure from the spirit and scope of the invention.

What is claimed is:

1. A process comprising:
    placing a fiber mat and a curable resin in a first cavity of a first compression molding tool, the curable resin comprising an aromatic epoxy resin blend, a hardener, a catalyst, and an ultraviolet light stabilizer, the aromatic epoxy resin blend comprising a relatively low molecular weight diglycidyl ether of bisphenol-A and a relatively higher molecular weight diglycidyl ether of a bisphenol-A, the first cavity being at least partially defined by a first gap when the first compression molding tool is closed;
    applying a first heat and a first pressure to the fiber mat and the curable resin to partially cure the resin to a semisolid state to provide a preform, the first heat ranging from about 80° C. to about 110° C. and the first pressure ranging from about 0.2 MPa to about 0.5 MPa;
    applying a second heat and a second pressure to the preform to reflow at least a portion of the resin in a second compression molding tool having a second cavity at least partially defined by a second gap when the second compression molding tool is closed, and cure any uncured portion of the resin to form a composite panel having a transparent resin layer over the fiber mat, the second heat ranging from about 130° C. to about 160° C. and the second pressure ranging from about 1.0 MPa to about 2.0 MPa, wherein at least portions of the fiber mat are visible through the resin layer, and wherein the composite panel is substantially free of fiber readout and the second gap is smaller than the first gap.

2. A process comprising:
    providing a fiber mat and impregnating the fiber mat with a curable resin, wherein the curable resin comprises an aromatic epoxy resin blend, a hardener, a catalyst, and an ultraviolet light stabilizer, the aromatic epoxy resin blend comprising a relatively low molecular weight diglycidyl ether of bisphenol-A and a relatively higher molecular weight diglycidyl ether of bisphenol-A;
    placing the resin impregnated fiber mat in a first cavity of a preforming tool and applying a first heat and a first pressure to cure at least a portion of the curable resin and to provide a preform, the first cavity being defined by a first gap when the preforming tool is closed;

placing the preform in a second cavity of a second molding tool and applying a second heat and a second pressure to the preform to reflow at least a portion of the resin and to cure any uncured portion of the resin and to form a composite having a resin layer over the fiber mat and wherein at least portions of the fiber mat are visible through the resin layer, the composite panel being substantially free of fiber readout, wherein the second cavity is defined by a second gap that is smaller than the first gap of the preforming tool, and wherein the second molding tool has a higher quality surface finish than the preforming tool.

3. A process as set forth in claim 2 wherein the relatively low molecular weight diglycidyl ether of bisphenol-A has an average molecular weight from about 300 to about 500, and wherein the relatively higher molecular weight diglycidyl ether of bisphenol-A has an average molecular weight from about 800 to about 1200.

4. A process as set forth in claim 2 wherein hardener comprises an anhydride.

5. A process as set forth in claim 2 wherein the hardener comprises methyl tetrahydrophthalic anhydride.

6. A process as set forth in claim 2 wherein the hardener comprises methyl hexahydrophthalic anhydride.

7. A process as set forth in claim 2 wherein the catalyst comprises an amine based compound.

8. A process as set forth in claim 2 wherein the catalyst comprises N,N-benzyldimethylamine.

9. A process as set forth in claim 2 wherein the ultraviolet light stabilizer comprises 2-ethylhexyl-2-cyano-3,3-diphenylacrylate.

10. A process as set forth in claim 2 wherein the curable resin further comprises a nanoparticle filler.

11. A process as set forth in claim 2 wherein the curable resin further comprises a nano silica dispersion.

12. A process as set forth in claim 1, wherein the relatively low molecular weight diglycidyl ether of bisphenol-A has an average molecular weight from about 300 to about 500, and wherein the relatively higher molecular weight diglycidyl ether of bisphenol-A has an average molecular weight from about 800 to about 1200.

13. A process as set forth in claim 1, wherein said fiber mat is impregnated with said curable resin.

14. A process comprising:
providing a fiber mat and impregnating the fiber mat with a curable resin, wherein the curable resin comprises (1) an aromatic epoxy resin blend that comprises a relatively low molecular weight diglycidyl ether of bisphenol-A and a relatively higher molecular weight diglycidyl ether of bisphenol-A, the relatively low molecular weight diglycidyl ether of bisphenol-A having an average molecular weight from about 300 to about 500 and the relatively higher molecular weight diglycidyl ether of bisphenol-A having an average molecular weight from about 800 to about 1200, (2) an anhydride hardener comprising at least one of methyl tetrahydrophthalic anhydride or methyl hexahydrophthalic anhydride, (3) a catalyst comprising N,N-benzyldimethylamine, and (4) an ultraviolet light stabilizer;
placing the resin impregnated fiber mat in a preforming tool and applying a first heat and a first pressure to cure at least a portion of the curable resin and to provide a preform, the first heat ranging from about 80° C. to about 110° C. and the first pressure ranging from about 0.2 MPa to about 0.5 MPa;
using the same preforming tool or a second molding tool and applying a second heat and a second pressure to the preform to reflow at least a portion of the resin and to cure any uncured portion of the resin and to form a composite having a resin layer over the fiber mat the second heat ranging from about 130° C. to about 160° C. and the second pressure ranging from about 1.0 MPa to about 2.0 MPa, and wherein at least portions of the fiber mat are visible through the resin layer, and wherein the composite panel is substantially free of fiber readout.

15. A process as set forth in claim 14 wherein the ultraviolet light stabilizer comprises 2-ethylhexyl-2-cyano-3,3-diphenylacrylate.

16. A process as set forth in claim 1 wherein the aromatic epoxy resin blend is present in an amount that ranges from about 30 to about 80 weight percent, wherein the hardener is present in an amount that ranges from about 20 to about 60 weight percent, wherein the catalyst is present in an amount that ranges from about 0.4 to about 2.0 weight percent, and wherein the ultraviolet light stabilizer is present in an amount that ranges from about 1 to about 3 weight percent.

17. A process as set forth in claim 2 wherein the aromatic epoxy resin blend is present in an amount that ranges from about 30 to about 80 weight percent, wherein the hardener is present in an amount that ranges from about 20 to about 50 weight percent, wherein the catalyst is present in an amount that ranges from about 0.4 to about 2.0 weight percent, and wherein the ultraviolet light stabilizer is present in an amount that ranges from about 1 to about 3 weight percent.

18. A process as set forth in claim 14 wherein the aromatic epoxy resin blend is present in an amount that ranges from about 30 to about 80 weight percent, wherein the anhydride hardener is present in an amount that ranges from about 20 to about 60 weight percent, wherein the catalyst is present in an amount that ranges from about 0.4 to about 2.0 weight percent, and wherein the ultraviolet light stabilizer is present in an amount that ranges from about 1 to about 3 weight percent.

19. A process comprising:
placing a fiber mat and a curable resin in a first cavity of a first compression molding tool, the curable resin comprising an aromatic epoxy resin blend, a hardener, a catalyst, and an ultraviolet light stabilizer, the aromatic epoxy resin blend comprising a relatively low molecular weight diglycidyl ether of bisphenol-A and a relatively higher molecular weight diglycidyl ether of a bisphenol-A, the first cavity being at least partially defined by a first gap when the first compression molding tool is closed;
applying a first heat and a first pressure to the fiber mat and the curable resin to partially cure the resin to a semisolid state to provide a preform, the first heat ranging from about 80° C. to about 110° C. and the first pressure ranging from about 0.2 MPa to about 0.5 MPa;
applying a second heat and a second pressure to the preform to reflow at least a portion of the resin in a second compression molding tool having a second cavity at least partially defined by a second gap when the second compression molding tool is closed, and cure any uncured portion of the resin to form a composite panel having a transparent resin layer over the fiber mat, wherein at least portions of the fiber mat are visible through the resin layer, and wherein the composite panel is substantially free of fiber readout and the second gap is smaller than the first gap.

20. A process comprising:
providing a fiber mat and impregnating the fiber mat with a curable resin, wherein the curable resin comprises (1) an aromatic epoxy resin blend that comprises a relatively low molecular weight diglycidyl ether of bisphenol-A and a relatively higher molecular weight diglycidyl ether of bisphenol-A, the relatively low molecular weight diglycidyl ether of bisphenol-A having an average molecular weight from about 300 to about 500 and the relatively higher molecular weight diglycidyl ether of bisphenol-A having an average molecular weight from about 800 to about 1200, (2) an anhydride hardener comprising at least one of methyl tetrahydrophthalic anhydride or methyl hexahydrophthalic anhydride, (3) a catalyst comprising N,N-benzyldimethylamine, and (4) an ultraviolet light stabilizer;
placing the resin impregnated fiber mat in a preforming tool and applying a first heat and a first pressure to cure at least a portion of the curable resin and to provide a preform;
using the same preforming tool or a second molding tool and applying a second heat and a second pressure to the preform to reflow at least a portion of the resin and to cure any uncured portion of the resin and to form a composite having a resin layer over the fiber mat the second heat ranging from about 130° C. to about 160° C. and the second pressure ranging from about 1.0 MPa to about 2.0 MPa, and wherein at least portions of the fiber mat are visible through the resin layer, and wherein the composite panel is substantially free of fiber readout.

\* \* \* \* \*